United States Patent [19]

Miyamoto et al.

[11] Patent Number: 4,860,113
[45] Date of Patent: Aug. 22, 1989

[54] CAMERA WITH ENHANCED COMMUNICATION WITH DETACHABLE LENS

[75] Inventors: Ryosuke Miyamoto, Kawasaki; Shinji Sakai, Yokohama, both of Japan

[73] Assignee: Canon Kabushiki Kaisha, Tokyo, Japan

[21] Appl. No.: 243,237

[22] Filed: Sep. 7, 1988

Related U.S. Application Data

[63] Continuation of Ser. No. 915,014, Oct. 3, 1986, abandoned.

[30] Foreign Application Priority Data

Oct. 8, 1985 [JP] Japan .................... 60-224498

[51] Int. Cl.⁴ ............................................. G03B 7/091
[52] U.S. Cl. .................................... 358/225; 358/909; 354/286
[58] Field of Search ............... 358/225, 228, 906, 909; 354/286

[56] References Cited

U.S. PATENT DOCUMENTS

| | | | |
|---|---|---|---|
| 3,968,504 | 7/1976 | Komine | 354/46 |
| 4,404,595 | 9/1983 | Ushiro et al. | 358/228 |
| 4,466,019 | 8/1984 | Sakashita | 358/225 |
| 4,509,846 | 4/1985 | Nakai et al. | 354/286 |
| 4,518,239 | 5/1985 | Tomori | 358/225 |
| 4,527,205 | 7/1985 | Konishi | 358/909 |
| 4,529,288 | 7/1985 | Nakai et al. | 354/286 |
| 4,540,262 | 9/1985 | Nakai et al. | 354/286 |
| 4,560,267 | 12/1985 | Nakai et al. | 354/286 |
| 4,589,750 | 5/1986 | Tomori et al. | 358/228 |

FOREIGN PATENT DOCUMENTS 6026324  6/1985  Japan .

OTHER PUBLICATIONS

"Canon F-1 Elektronisches Fernsteuerungsstystem", date not given–noted as prior art (paper #9) by Applicant.

Primary Examiner—Jin F. Ng
Assistant Examiner—Stephen Brinich
Attorney, Agent, or Firm—Robin, Blecker & Daley

[57] ABSTRACT

A camera of the type having a camera body and a lens unit for detachable joinder therewith has data storage devices and processors in both the camera body and the lens unit, the processors being mutually compatibly programmed to enhance data communication between the camera body and the lens unit. The camera body processor is adapted to transmit commands to the lens unit processor and the latter is adapted to both confirm receipt of such commands and to provide indication of modifications of such commands based on lens unit capabilities. The camera body processor has companion capabilities for effecting photo-taking operations therein in respective diverse manners based on the nature of the lens unit output thereto in response to such commands.

29 Claims, 6 Drawing Sheets

| FIG.2A |
|---|
| FIG.2B |

FIG. 2A

| NAMES OF COMMANDS | | LEVEL | OPE-RAND | CODES | CONTENTS | DATA | CONTENTS OF DATA |
|---|---|---|---|---|---|---|---|
| TEST COMMANDS | TEST PRESENT Av | 1 | 0 BYTE | 41H | ASK PRESENT APERTURE VALUE | 1 BYTE | ↓ |
| | TEST Avo | 1 | 0 | 4F | ASK OPENING VALUE OF APERTURE | 1 | ↓ |
| | TEST Avc | 1 | 0 | 43 | ASK DEGREE OF APERTURE VALUE CORRECTION | 1 | ↓ |
| | TEST Bvmax | 1 | 0 | 4D | ASK MAXIMUM POSSIBLE NUMBER OF STOPPING-DOWN STEPS FROM PRESENT POSITION | 2 | ASSURABLE RANGE FOR 1/4 STEP PRECISION; ASSURABLE RANGE FOR 1/2 STEP PRECISION |
| | TEST ZOOM POSITION | 1 | 0 | 4C | ASK FOCAL LENGTH | 1 | ↓ |
| | TEST Dv | 1 | 0 | 44 | ASK POSITION OF DISTANCE RING | 1 | ↓ |
| | TEST STATUS | 1 | 0 | 53 | ASK STATE OF LENS | 1 | ↓ |
| | TEST COLOR | 1 | 0 | 48 | ASK SPECTRAL CHARACTERISTIC OF LENS | 2 | R/G, B/G |
| | TEST LOSS | 1 | 0 | 4A | ASK TRANSMISSION FACTOR OF LENS | 1 | ↓ |
| | TEST ID | 1 | 0 | 49 | ASK MAKER, KIND AND FUNCTION OF LENS | 7 | ↓ |
| | TEST EXIT PUPIL | 1 | 0 | 58 | ASK POSITION OF EXIT PUPIL | 1 | ↓ |

FIG. 2B

| OPERATION COMMANDS | | | | RESET | | | ABSOLUTE APERTURE VALUE | NUMBER OF APERTURE STEPS | STEP VALUE OF LUMINANCE ON SOLID-STATE IMAGE SENSOR | | NUMBER OF APERTURE STEPS |
|---|---|---|---|---|---|---|---|---|---|---|---|
| HARD BRAKE | 0 | 0 | — | — | — | — | 0 | 0 | — | — | — |
| END OF OPERATION | 1 | 1 | — | OPEN THE APERTURE; PREPARE FOR TURNING OFF OF POWER SUPPLY | | | 0 | 0 | — | — | — |
| BRAKE | 1 | 1 | 45 | SUSPEND WORK; WAIT FOR NEXT COMMAND | | | 0 | 0 | — | — | — |
| GO TO ABS-Av | 1 | 1 | 42 | OPERATE APERTURE (F.No) | | | 1 | — | — | — | — |
| GO TO REL-Av | 1 | 1 | 47 | OPERATE APERTURE (Ev) | | | — | 1 | — | — | — |
| GO TO REL-Bv | 1 | 1 | 52 | OPERATE APERTURE (Ev CORRECTION) | | | — | — | 1 | — | — |
| GO TO REL-f | 2 | 2 | 54 | MAKE POWER ZOOMING | | | 0 | 0 | — | — | — |
| OPERATION AF | 1 | 0 | 55 | AF SWITCH OF LENS ALLOWED TO OPERATE OR NOT | | | 0 | 0 | — | — | — |
| START AF ON THE LENS SIDE | 2 | 3 | 48 / 4E | START AF WITH LENS | | | 0 | 0 | — | — | — |
| GO TO REL-Dv | 2 | 2 | 46 | POWER FOCUSING | | | 0 | 0 | — | — | — |
| GO TO REL-Bv SLOWLY | 2 | 2 | 50 | SLOWLY OPERATE THE STOP (Ev) | | | — | — | 1 | — | 1 |

CAMERA WITH ENHANCED COMMUNICATION WITH DETACHABLE LENS

This application is a continuation, of application Ser. No. 915,019, filed Oct. 3, 1986.

BACKGROUND OF THE INVENTION

1. Field of the Invention

This invention relates to a camera system which comprises a camera body and accessories of varied kinds such as a lens, a flash device, etc. mounted on the camera body.

2. Description of the Related Art

Camera system of the kind arranged to store various data necessary for photographing at a ROM (a read-only memory or an information fixed storage circuit) disposed within such an accessory as an interchangeable lens or a flash device to be mounted on the camera body and to have the stored data supplied to the camera body in photographing by designating an applicable address of the ROM have been known. An example of such a camera system was disclosed in U.S. Pat. No. 4,529,288. When the amount of data to be handled in the camera system of this kind increases, however, the number of signal lines for addresses must be increased accordingly. Further, since the camera body must be arranged to perform control directly over each of the accessories on the basis of the data obtained by the address designation, the soft- and hardwares to be arranged on the side of the camera body inevitably becomes complex. To solve this problem, there has been proposed in Japanese Laid-Open Patent Application No. SHO 60-26324 a camera system which is arranged to have a microcomputer disposed also within the above-stated accessory and to have common data transmission lines arranged to permit communication between the microcomputer of the accessory and another microcomputer disposed within the camera body.

However, in the event of an error which arises on a transmission line in transmitting a command or instruction from the microcomputer of the camera body to each of the accessories due to a stain on an electric contact or the rust thereof or due to an external noise or the like thus resulting in an erroneous or unexecutable instruction, the microcomputer arranged within the camera body of the above-stated camera system is incapable of detecting the occurrence of the trouble and thus has been unable to take any apposite action. Further, the microcomputer within the camera body is incapable of detecting whether or not the instruction given to the accessory is actually carried out and thus has sometimes failed to adequately perform subsequent actions.

SUMMARY OF THE INVENTION

A first object of this invention is to solve the above-stated problems.

A second object of this invention is to provide a camera system and component devices thereof communication between the camera body and accessories mounted on the camera body.

A third object of this invention is to provide a camera system and component devices thereof which are arranged to enable the camera body to find how an instruction given from the camera body to an applicable accessory coupled with the camera body is actually carried out.

Under this object, a camera system arranged as a preferred embodiment thereof comprises: a camera body including (a) means for transmitting a command to an accessory, (b) means for receiving, from the accessory, data obtained by correcting the command and (c) control means for controlling the operation process of the camera body according to the data; and the above-stated accessory including (a) means for receiving the command transmitted by the transmitting means of the camera body, (b) means for operating the accessory in response to the command received by the receiving means and (c) means for transmitting the data which is obtained by correcting the command.

Another object of this invention is to provide a camera system capable of having novel and useful instructions and data transmitted and exchanged between the camera system and an accessory coupled with the camera body.

In a camera arranged to attain the abovestated object as a preferred embodiment of this invention, an accessory is provided with storage means for storing new data of varied kinds such as the transmission factor of a photo-taking lens, etc.; means for reading out the stored data is provided on the side of the camera body; and thus the new data is read from the accessory into the camera body or the accessory is then caused by the camera body to take a new action according to the data read out.

Further objects and features of this invention will become apparent from the following detailed description of a preferred embodiment thereof taken in connection with the accompanying drawings.

BRIEF DESCRIPTION OF THE DRAWINGS

FIGS. 2A-2B is a table showing the details of commands to be given from a camera body 1 to a lens 2 for controlling the lens in accordance with the arrangement of the same embodiment.

DETAILED DESCRIPTION OF THE PREFERRED EMBODIMENT

Figures 1, 2:
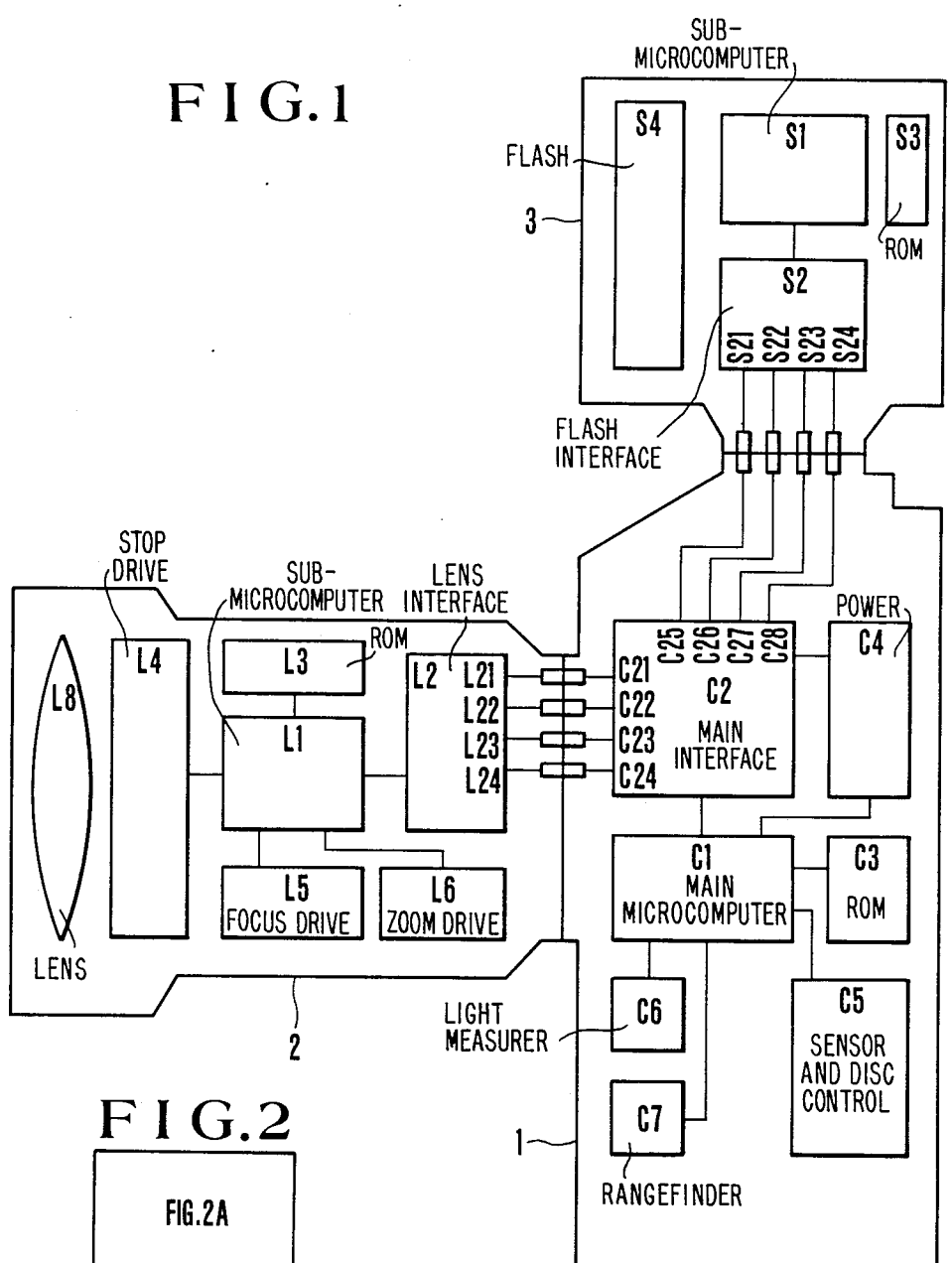
FIG. 1 is a block diagram showing in outline the arrangement of a camera system as an embodiment of this invention.
FIG. 2 describes the relationship of FIGS. 2A and 2B.

Referring to FIG. 1 which shows in a block diagram a camera system arranged as a preferred embodiment of this invention, the illustration includes a camera body 1. The camera body 1 includes a main microcomputer C1 (hereinafter referred to as main micom); a main interface C2; power supply output terminals C21 and C25; data terminals C22 and C26; busy terminals C23 and C27; grounding terminals C24 and C28; a ROM C3; a power supply C4; a solid-state image sensor and disc driving part C5 which is arranged to convert an incident light flux coming through a photo-taking lens 2 into an electrical signal and to record the signal on a disc part which is not shown; a light measuring system C6; and a distance measuring system C7. A lens unit 2 which is attachable and detachable to and from the camera body 1 and includes a sub-microcomputer L1 (hereinafter referred to as sub-micom); a lens interface L2; a power supply terminal L21; a data terminal L22; a busy terminal L23; a grounding terminal L24; a ROM L3; a stop driving system L4; a focusing drive system L5; a zooming drive system L6; and an image forming optical system L8 which is arranged to be driven by the drive systems L5 and L6. The camera system includes a flash device unit 3. The flash unit 3 includes a sub-micom S1; a flash device interface S2; a power supply terminal S21; a data terminal S22; a busy terminal S23; a grounding terminal S24; a ROM S3; and a flashing part S4. Further, the busy terminals C23 and C27 are kept at a high (H) level while the micoms C1 and L1 are processing signals.

The operation of the camera system and particularly control operations on the lens unit 2 are as described below with reference to FIGS. 2 to 5:

FIG. 2 shows in details the commands to be transmitted from the camera body 1 to the lens unit 2 for controlling the latter. The commands include test commands which are instructing the lens to transmit information on various constants of the lens to the camera body; and operation commands which are instructions for causing the lens unit to drive the aperture, the focusing device, the zooming device, etc. The operation commands are normally accompanied by information on specific values called the operands.

In other words, the operation commands are given to the lens unit to operate lens members to predetermined degrees for stopping-down, focusing and zooming operations. In most cases, the commands are executable only when they are received in combination with the operands which represent such operating degrees.

The details of the commands shown in FIG. 2 are as follows: "test present Av" has a priority level of 1 and does not have to be accompanied by any operand. This command is asking simply for the present aperture value. With this command carried out, a data answer of one byte is transmitted from the sum-micom Li to the main micom C1. An arrow "←" in a column "Contents of data" indicates that the content of the data is identical with the content of the command shown in a column "Contents". The commands "test Avo", "test Avc", "test Dv", "test status", "test loss" and "test exit pupil" are also of the priority level 1 and require no operand. They are one-byte commands like in the case of the "test present Av". The contents of these commands are as shown in the column "Contents".

A command "test Bvmax" is asking for information about a maximum possible number of stopping-down steps from the present aperture of the lens. This type of command requires a data answer in 2 bytes. The data of two bytes corresponds to data on an assurable range for ¼ step precision and also to data on an assurable range for ½ step precision in stopping down the aperture of the lens to a minimum aperture.

Another command "test color" asking for the spectral characteristic of the lens requires also a data answer of two bytes, which respectively correspond to the spectral characteristics R/G and B/G of the lens. A command "test ID" is asking for information on the manufacturer, kind and function of the lens. For an answer to this specific command, a total of seven bytes are allotted in the case of this specific embodiment. The command "test exit pupil" which requires data of one byte asks for the position of the exit pupil for the following reason:

In this embodiment, a solid-state image sensor is employed. The image sensor is arranged to convert an incident light flux into an electrical signal, which is arranged to be stored at a disc part (not shown). Generally, the so-called latitude of the solid-state image sensor to be used in a camera of this kind is much narrower than a silver-halide film. Therefore, an extremely high degree of precision is required for automatic exposure control. Meanwhile, among photo-taking lenses of the same F number, their actual F number varies to a considerable degree depending upon the position of the exit pupil. Therefore, the actual F number must be corrected according to the position of the exit pupil. For example, if the exit pupil position is away from the center of the aperture of the photo-taking lens, a stopping down operation on the lens aperture results in a darker aperture value than a preset aperture value. In the case of this embodiment, therefore, data on the exit pupil position is stored at the photo-taking lens beforehand; and the stored data is taken out by giving the command for necessary correction. The details of the operation commands are as follows:

A command "hard brake" is a reset instruction for suspending a process presently being performed by the sub-micom S1. The command has the highest priority of 0. A command "end of operation" is an instruction to be carried out immediately before the power supply is cut off. This requires an action for bringing the lens 2 into a predetermined state, such as opening the aperture of the lens 2, which is necessary before the power supply is cut off. Another command "brake" is for suspending the process of the sub-micom S1 and is also a reset instruction. However, the priority of this command is at the level 1. A command of this type is valid only when a command of a priority level 2 is carried out. A command "go to ABS-Av" is for bringing the position of the aperture into an absolute aperture value Av which is obtained by computation. The degree to which the aperture is to be driven is communicated in the form of an operand of one byte. Further, in response to this command, data on the absolute aperture value which is obtained by actually driving the aperture of the lens according to the command is transmitted from the sub-micom L1 to the main micom C1. This data is in one byte in the same manner as the operand. A command "go to REL-Av" is for stopping down the present aperture value to a degree designated by an operand. A command "go to REL-Bv is also for stopping down the aperture. In this case, however, a number of stopping down steps is designated for decreasing the quantity of light incident on the solidstate image sensor C5. A difference between the two commands "go to REL-Av" and "go to REL-Bv" is as follows: Assuming that the present aperture value is F2, the apperture becomes F1.4 when the command "go to REL-Av" is given, for example, instructing to open the aperture by one step. In case that the command "go to REL-Bv" is received instructing to open the aperture by one step, however, the aperture is driven in such a manner as to have the light quantity increased by one step considering it as reduced to the quantity of light incident on the solid-state image sensor C5. Therefore, in the latter case, the aperture value does not always become F1.4 but, for example, sometimes becomes F1.2.

A command "go to REL-f" has the priority at a level 2 and is an instruction for changing the focal length of the lens. This command is executed in accordance with an operand of two bytes designating a focal length and a speed at which the focal length is to be changed. A command "operation AF" is given to the lens to instruct the latter as to whether a detector which is arranged to detect the focused state of the camera is to be operated or not in case that the lens has such detector disposed within the lens. A code 4B shown in FIG. 2 indicates a case where this command is instructing the lens to operate this detector while another code 4E indicates a case where this does not instruct to operate the detector. A command "start AF on the lens side" is of the priority level of 2 and is for causing the AF device of the lens to perform an automatic focusing operation. This command is carried out with an operand of three bytes designating or indicating a deviating extent from an in-focus position, a speed at which adjustment is to be made to the in-focus position and the direction of focusing adjustment is to be made to the in-focus position and the direction of focusing adjustment. A command "go to REL-Dv" has the priority level of 2 and is to be executed with an operand of two bytes indicative of a lens driving extent and a lens driving direction. Another command "go to REL-Bv slowly" instructs to slowly operate the aperture. In the case of continuous photographing, etc., if the aperture is operated too fast, the exposed state of one photographed frame would come to greatly differ from that of another. To prevent such troubles, this command instructs for a slow driving operation on the aperture. The command is executed in accordance with an accompanying operand of two bytes designating a stop driving degree and an aperture shifting speed.

The operands which are transmitted along with the above-stated commands "go to ABS-Av", "go to REL-Av", "go to REL-f", and "go to REL-Bv slowly" are subjected to a discriminating process to see whether or not they are executable by the lens 2. They are thus corrected by the sub-micom L1 into data of one byte which is executable by the lens 2. Each of the corrected data of one byte is returned to the camera body 1. In other words, the camera body 1 is informed of the result of an action taken in response to each of these commands and, in the event of an unexecutable or inappropriate data, the camera body takes some suitable actions upon receipt of the data. Such actions include a warning display and, if the returned data relates to the aperture value of the lens, the shutter time is re-computed on the basis of the data in performing shutter time control next time.

Figure 3:
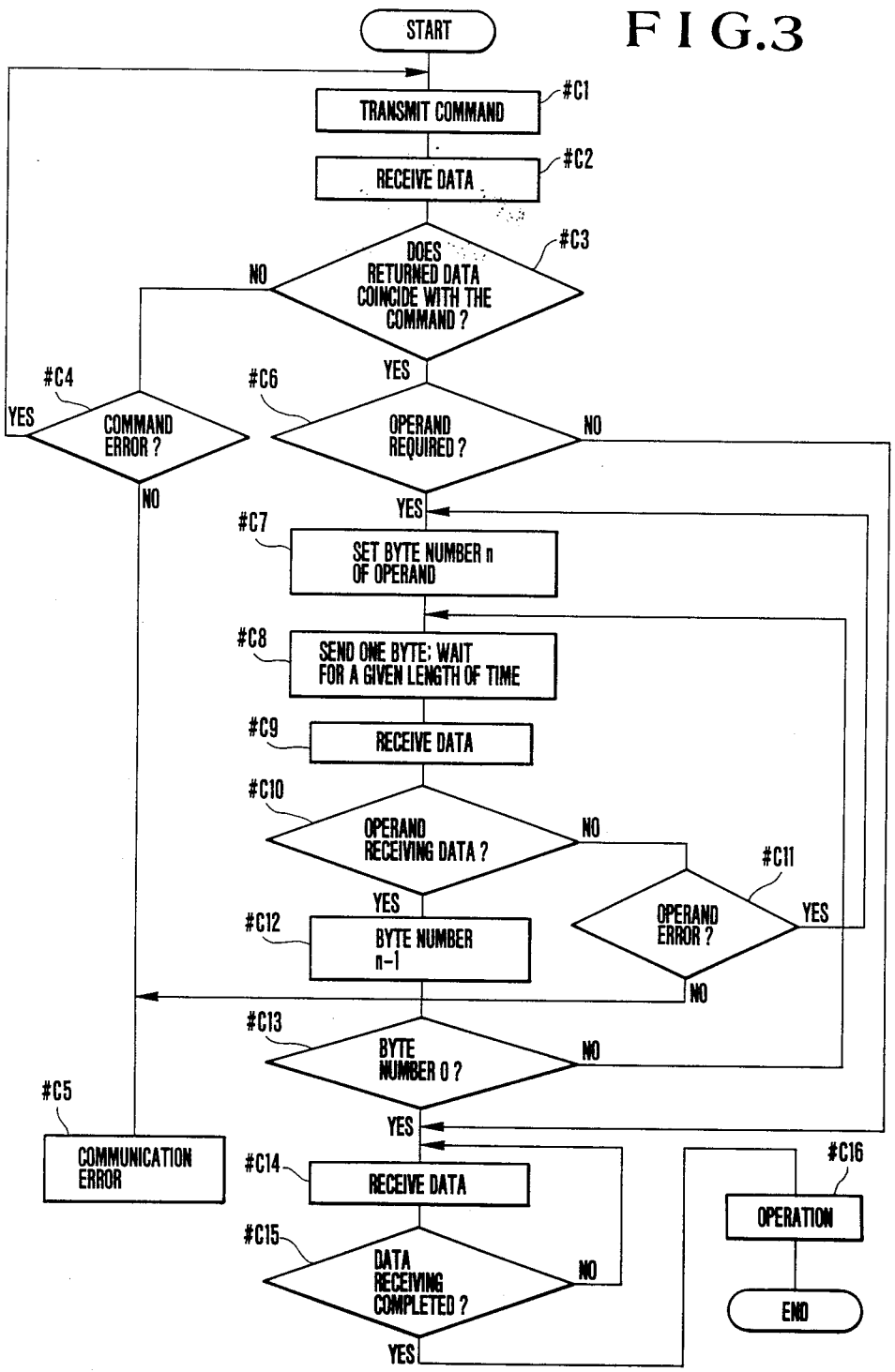
FIG. 3 is a flow chart showing the operation of a main microcomputer C1 of the embodiment.
Figure 4:
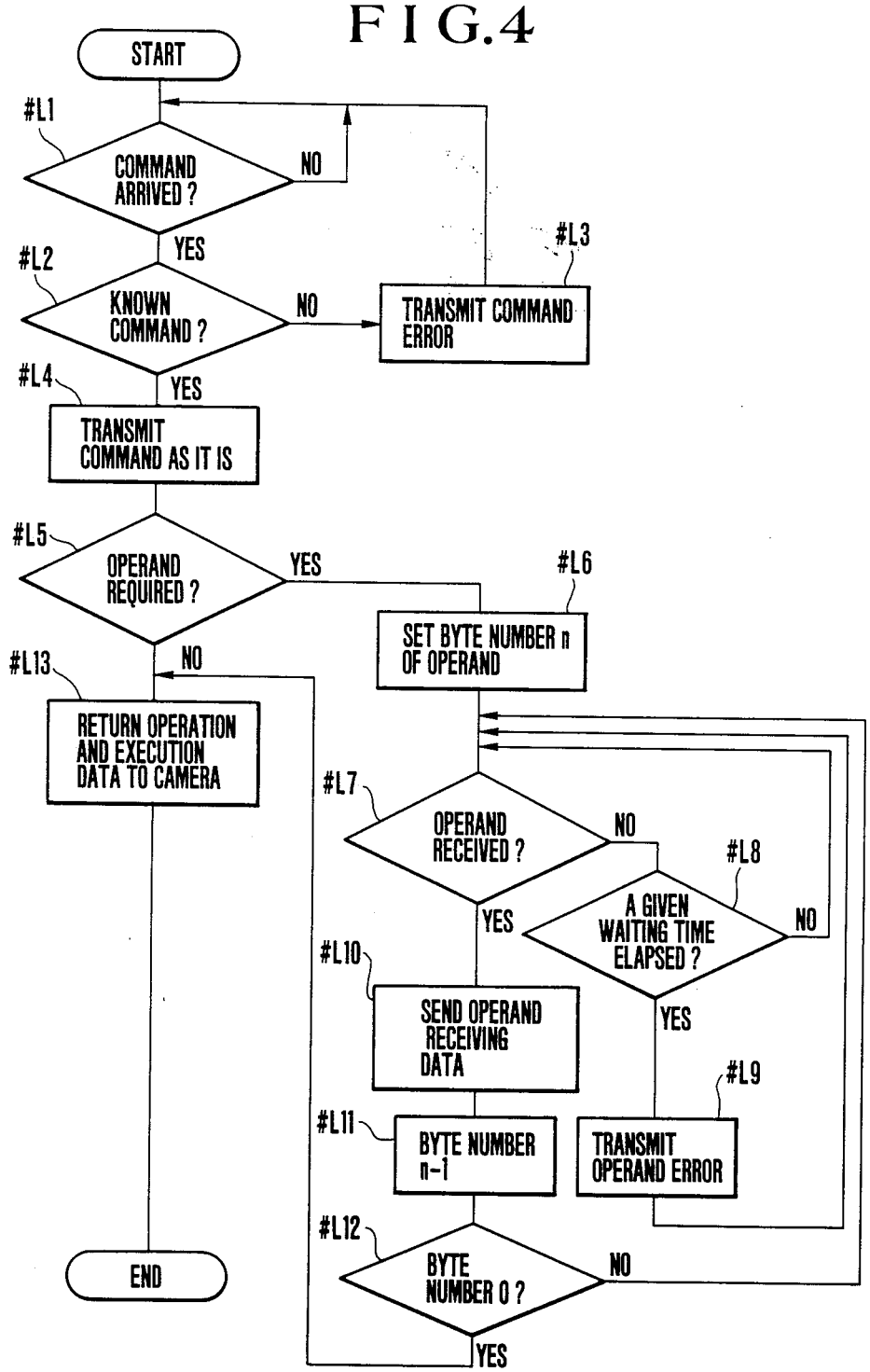
FIG. 4 is a flow chart showing the operation of a sub-microcomputer L1 of the embodiment.

The operation of the main micom C1 is as shown in a flow chart in FIG. 3 and that of the sub-micom L1 as shown in FIG. 4. Referring first to FIG. 3, the flow of operation of the main micom C1 is as described below:

Step #C1

A command is transmitted from the camera body to the lens via the above-stated terminals C22 and L22.

Step #C2

Returned data is received from the lens 2.

Step #C3

A check is made to see if the returned data is the same as the command transmitted at the step #C1. If so, the main micom C1 proceeds to a step #C6 on the assumption that the lens 2 has undertaken the execution of the command. In the event of any discrepancy between the transmitted command and the returned data, the main micom C1 proceeds to another step #C4.

Step #C4

With the returned data having been found not coinciding with the transmitted command, a check is made at this step to see if the returned data is indicative of any command error. If the data is found to be indicating a command error, the operation comes back to the step #C1 and a command is newly transmitted. If the data is not indicating any command error, the operation proceeds to a step #C5.

Step #C5

With the returned data not indicating any command error, the above-stated discrepancy is considered to have resulted from an error occurred during transmission. In that event, the camera body 1 is caused to make a warning display thereon.

Step #C6

This step ensues immediately from the step #C3. At this step, a check is made to see whether or not the command transmitted at the step #C1 requires an operand. If no operand is required, the flow of operation jumps to a step #C14. If an operand is necessary, the operation proceeds to a step #C7.

Step #C7

The number n of bytes of the operand is set.

Step #C8

One byte of the operand is sent out. A given waiting time ensues.

Step #C9

Data from the lens 2 is received.

Step #C10

The data from the lens 2 is checked to see if it is an operand receiving data. In other words, as will be further described later, upon receipt of an operand, the lens 2 transmits data indicative of receipt of the operand. If no operand is received, the lens sends data indicative of an operand error. Therefore, the camera body 1 receives such data from the lens 2 at the step #C10. If the data from the lens 2 is operand receiving data, the flow of operation proceeds to a step #C12. If it is not, the operation proceeds to a step #C11.

Step #C11

The data which is determined to be not operand receiving data at the preceding step #C10 is checked to find whether it is operand error data. As will be described later, the lens 2 transmits operand receiving data to the camera body 1 upon receipt of an operand and an operand error data to the camera body if no operand is received. In other words, the lens 2 answers the camera body 1 only with operand receiving data or operand error data. Therefore, in case that the data from the lens 2 is judged to be not the operand receiving data at the step #C10 and also not to be the operand error data at the step #C11, the flow of operation comes to the step #C5 on the assumption that an error has occurred during the process of transmission. If the data is determined to be the operand error data, the flow of operation comes to the step #C7.

Step #C12

Upon detection of that the operand receiving data is transmitted from the lens 2 to the camera body 1 at the step #C10, "1" is subtracted from the byte number n which has been set at the step #C7.

Step #C13

The byte number resulting from the subtraction made at the step #C12 is checked to find whether it is "0" or not. If it is found not "0", the operation comes to the step #C8 to repeat the loop of processes from the step #C8 to the step #C13. In the event of "0", the operation proceeds to a step #C14. In other words, the loop of steps from #C8 to #C13 is repeated until all the operands of the byte number set at the step #C7 are transmitted in answer.

Step #C14

In case that no operand is found necessary at the step #C6, or in case that the byte number of the operand is found to be 0 at the step #C13, the flow of operation comes to this step #C14 to receive data from the lens.

Step #C15

The loop of steps up to the steps #C14 and #C15 is repeated until receipt of data from the lens 2. Upon receipt of data, the flow of operation proceeds to a step #C16.

Step #C16

With the data received from the lens 2, if the command transmitted to the lens 2 at the step #C1 relates to aperture control, a shutter time control operation is performed and then the flow of operation comes to an end.

While the operation of the main micom C1 performed within the camera body 1 is as described above, the operation of the sub-micom L1 which is arranged within the lens unit 2 to communicate with the main micom C1 is as described below with reference to the flow chart of FIG. 4:

Step #L1

At this step, the lens 2 awaits arrival of a command from the camera body 1. The operation of the sub-micom L1 proceeds to a step #L2 upon receipt of the command.

Step #L2

The command received is checked to see if it is feasible or executable. If so, the operation comes to a step #L4. If not, it proceeds to a step #L3. The infeasibility in this case means, for example, that the interchangeable photo-taking lens in use is incapable of carrying out all the commands shown in FIG. 2, or, in other words, it is incapable of carrying out some of the commands listed in FIG. 2.

Step #L3

Data indicative of that the command received at the step #L1 is infeasible or inexecutable is transmitted to the camera body 1. Upon receipt of this data, the main micom C1 within the camera body performs the above-stated steps beginning with the step #C4.

Step #L4

With the command determined to be executable at the step #L2, the command is returned to the camera body as it is. Upon receipt of the returned command, the main micom C1 within the camera body 1 performs the steps beginning with the step #C6.

Step #L5

The sub-micom L1 within the lens 2 checks the command received to see if it requires an operand. If so, the operation proceeds to a step #L6. If not, it comes to a step #L13.

Step #L6

With an operand determined to be necessary at the step #L5, a byte number n of the operand is set according to the command received.

Steps #L7 and #L8

With the step #L4 having been carried out, the main micom C1 sends one byte of operand from the camera body 1 at the step #C8. However, if no data of operand is received from the main micom after the lapse of a given waiting time at this step #L8, the operation of the sub-micom proceeds to a step #L9. If the operand is received, the operation comes to a step #L10.

Step #L9

Data indicating an operand error is transmitted to the main micom C1 of the camera body 1. In the event of this step, the flow of operation of the main micom C1 branches out from the step #C11 as indicated by "yes".

Step #L10

Operand receiving data indicative of the receipt of the transmitted operand is sent to the main micom C1.

Step #L11

From the number of bytes set at the step #L6 "1" is subtracted.

Step #L12

A check is made to see if the number of bytes set at the step #L11 is "0". In the case of 0, the operation proceeds to a step #L13. If it is not "0", the operation comes back to the step #L7 and the flow of the steps from #L7 to #L12 are repeated until the number of bytes becomes 0, i.e. until the operand is completely transmitted.

Step #L13

The instruction defined by the received command and operand is corrected into a feasible instruction or executable data. The executable data is supplied to the photo-taking lens 2. In other words, if the command transmitted from the camera body is a test command, the designated data is sent to the camera body 1. In case that the transmitted command is an operation command, the result of an operation performed according to the command is transmitted to the camera body 1.

The flow of operations to be carried out by the main micom C1 within the camera body 1 and by the sub-micom L1 within the lens 2 is as described above. However, when, for example, the command "go to ABS-Av" or the like is produced from the main micom C1, communication between the camera body 1 and the lens 2 is made in the following manner:

Let us assume, for example, that the result of computation made by the main micom C1 on the basis of information from the light measuring system C6 calls for stopping down the aperture of the photo-taking lens to F2.0. In this instance, a code 47H of FIG. 2 in which H indicates a hexadecimal number and which corresponds to the command "go to ABS-Av" is supplied to the sub-micom L1 via the main interfaces C2 and C22 to L22 and the interface L2 of the lens. Then, at the lens, the sub-micom L1 receives this command at the step #L1 of FIG. 4. At the step #L2, the sub-micom checks the command to see if its code 47H is known. Since the command is executable by the lens in this instance, the received command "47H" is returned as it is back to the main micom as returned data or as a feasibility confirming signal at the step #L3. At the step #C2, the main micom C1 receives this returned data from the lens 1. At the step #C3, the main micom checks the returned data to confirm that it is the code "47H" or, in other words, makes a check to see whether the returned data is an executable signal. Then, the step #C6 is performed. Since this particular command necessitate an operand, the operation of the main micom proceeds from the step #C6 to the step #C7. In the case of the command "go to ABS-Av", the operand is of one byte, n=1 is set at the step #C7. At the next step #C8, data of code "22H" which corresponds to F2.0 is transmitted in the same manner as a command. As for the values of operands for the commands, codes from 00H to EFH are allocated to setting aperture values which can be preset.

The sub-micom L1 receives the code "22H" as the operand at steps #L6 and #L7. Then, at the step L10, the sub-micom L1 sends out data or a message "F1H" indicative of receipt of the operand. The messages which are to be sent from the lens 2 to the camera body 1 are expressed in codes "F H", wherein indicates a value between 1 and F for the purpose of making distinction from the codes of operands. Upon receipt of the data or message "F1H" indicating completion of receipt of the operand at one of the steps from #C9 through #C13, the main micom C1 comes to perform the loop of steps #C14 and #C15.

Figure 5:
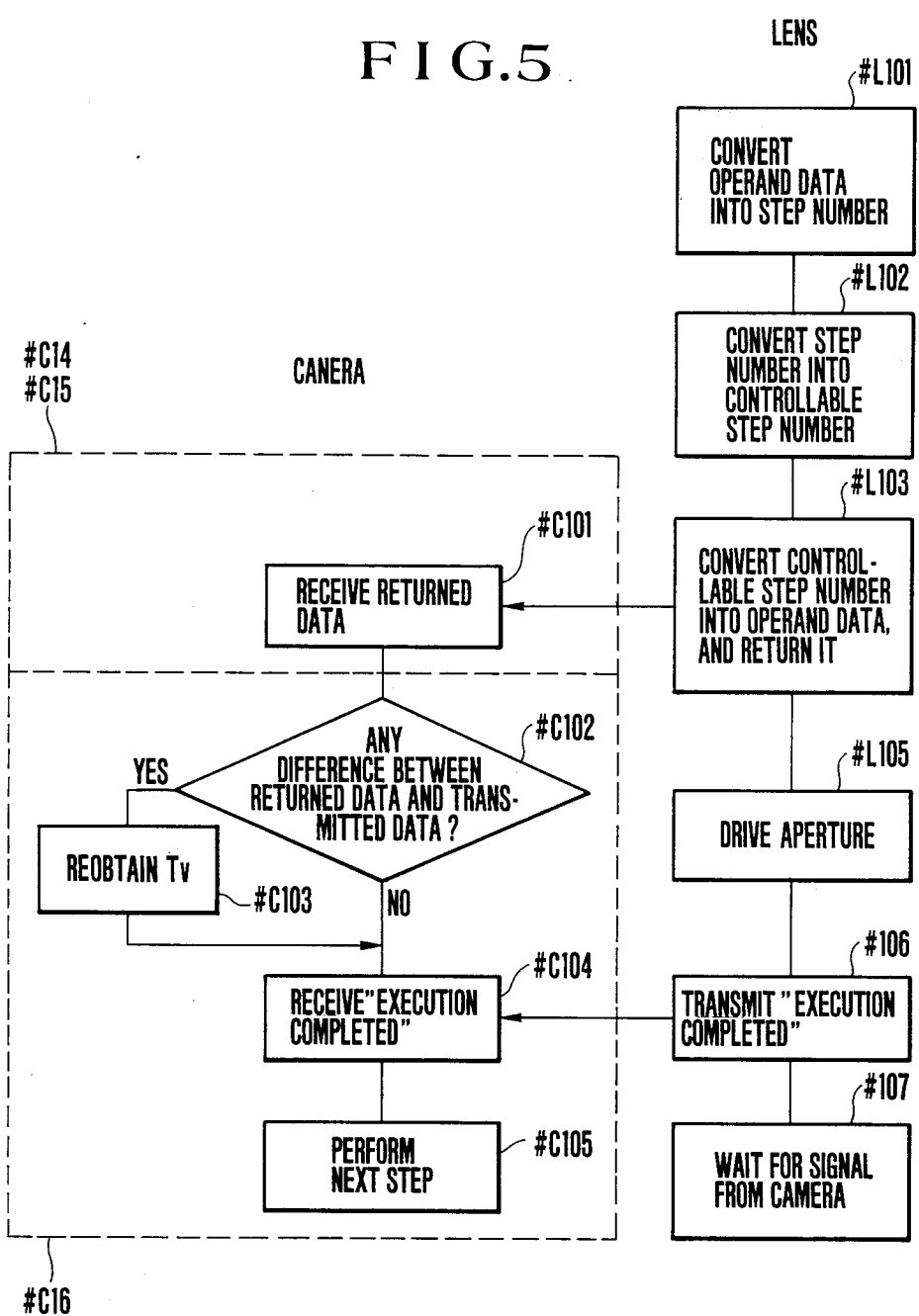
FIG. 5 is a flow chart showing operations to be carried out at a step #C16 of FIG. 3 and at a step #L13 of FIG. 4.

Referring now to FIG. 5, the details of the operation and the execution confirming data returning action of the sub-micom of the lens at the step #L13 of FIG. 4 and those of the operation at the step #C16 of FIG. 3 are as described below:

Step #L101

Using the operand data returned from the camera body to the lens with the flow of operation of the steps #L5 through #L12 carried out, a converting action is performed on the data to obtain a number of driving steps of an aperture driving stepper motor.

Step #L102

The step number obtained by the converting action at the step #L101 is checked to see if it is a controllable value. If not, the number of steps obtained is converted into an actually controllable step number in case that, for example, the step number obtained at the step #L101 requires to stopping down the lens aperture beyond the minimum aperture value of the lens in use.

Step #L103

The step number converted at the step #L102 is again converted into the form of operand data and is returned to the camera body 1. Then, the sub-micom L1 of the lens goes to perform a step #L105. Meanwhile, the operation of the camera body is as follows:

Step #C101

This step corresponds to the steps #C14 and #C15 of FIG. 3. The camera body receives from the lens the operand data corresponding to the number of steps by which the aperture can be actually stopped down as mentioned in the description of step #L103.

Step #C102

The operand data received at the step #C101 and the operand data transmitted from the camera body to the lens at steps #L5 to #L12 are compared with each other. The operation proceeds to the step #C103 if there is a difference between the two. If not, the operation comes to a step #C104.

Step #C103

With the difference found between the two data, a shutter time value (Tv) is again computed on the basis of the returned data.

Step #C104

The camera body receives from the sub-micom L1 of the lens an execution completion signal indicative of completion of control over the aperture. Then, the camera body performs a next step such as a step #C105. In the case of the embodiment shown in FIG. 5, a control operation to be performed at the above-stated next step means control over a shutter time.

After the operand data is returned to the camera body at the step #L103, the sub-micom L1 of the lens causes the aperture to be actually driven as shown at a step #L105 in FIG. 5. Upon completion of the driving action on the aperture, the sub-micom sends to the main micom C1 of the camera body an "execution completed" signal at a step #L106 and then wait for a signal from the camera body at a step #L107.

In the foregoing description, the command "go to ABS-Av" is taken up as an example in describing the flow of operations to be performed by the main micom C1 and the sub-micom L1 of the lens 2. However, these operations are performed in the same manner also for commands shown in FIG. 2.

In the foregoing, the photo-taking lens is described by way of example as an accessory. However, the accessory may be the flash unit shown in FIG. 1, may be a command back which is to be provided at the back lid part of the camera or may be a film winding device in the event of a camera using a silver-halide film. In such a case, the commands shown in FIG. 2 should be changed in a manner suitable for the accessory. In the embodiment, the sub-micom of the accessory is arranged to provide the main micom of the camera body with a signal indicative of the operability of the accessory in response to a command given from the main micom of the camera body; and, at the steps #L2 and #L4 of FIG. 4, the command is returned as it is to the main micom as an operability confirming signal when the command given is executable by the accessory. This signal enables the main micom C1 within the camera body 1 to confirm the feasibility of the command by comparing it at the step #C3 with the command sent out to find whether it coincides with the command which is transmitted at the step #C1.

This invention is not limited to the arrangement of the embodiment described. Various changes and modifications are of course possible without departing from the sprit and scope of the invention. For example, in case that the command given from the main micom C1 to the sub-micom L1 is not executable by the latter, the latter may be arranged to send to the former some data according to the command and to send to the former a signal indicative of unexecutability of the command only in the event of an unexecutable command. In that instance, a step at which the command from the main micom C1 to the sub-micom L1 at the step #C1 is discriminated as to whether it is executable or not corresponds to the discriminating means of this invention arranged to discriminate the executability of a signal from the sub-micom to the main micom. Further, among signals from the sub-micom L1 to the main micom C1, a signal other than an unexecutability indicating signal, such as data indicative of the result of execution of a command given from the main micom C1 corresponds to the operability or executability confirming signal of this invention. An action to send the data indicative of the result of execution of the command given to the sub-micom corresponds to the means of this invention arranged to send, from the sub-micom to the main micom of the camera body, an operability confirming signal indicative of the operability of the accessory.

As described in the foregoing, in accordance with the arrangement of the embodiment described, the micom of the camera body is enabled to detect any unexecutable instruction given to an accessory in the event of some error occurred during the process of transmission of a command or in the event of any command that is not executable by the accessory.

The invented arrangement, therefore, enables a camera system to take some necessary action such as making a warning display or sending a new command to the applicable accessory. Therefore, data and instructions can be accurately exchanged between the camera body and the accessory.

Further, in the embodiment described, the camera body is capable of knowing how the instructions or commands sent out to the accessory are executed by the accessory, so that ensuing control over the accessory can be accomplished in an optimum manner.

What is claimed is:

1. A camera system comprising:
   (A) a camera body including:
      (a) transmitting means for transmitting a command to an accessory;
      (b) processor means for generating said command and applying the same to said transmitting means and for receiving, from said accessory, data generated thereby responsively to said command, and for controlling photo-taking processes in said camera body in respective first and second different manners correspondingly with such data provided by said accessory; and
   (B) said accessory including:
      (a) processor means for receiving said command transmitted by said transmitting means of the camera body and operable in first mode for operating said accessory in correspondence with said received command and generating first data, and operable in second mode and therein generating second data indicative either of improper receipt of said received command or of infeasibility of operation of said accessory in accordance with said received command, and
      (b) transmitting means for transmitting generated such first and second data to said camera body processor means, said camera body processor means operating in said first and second manners respectively in response to receipt of said first and second data as generated by said accessory processor means.

2. A system according to claim 1, wherein said camera body further includes terminal means for transmitting said command from said camera body.

3. A system according to claim 1, wherein said transmitting means of said camera body transmits an operand together with said command.

4. A system according to claim 3, wherein said processor means of the camera body controls said photo-taking processes in accordance with the result of comparison between said operand transmitted by said camera body transmitting means and said first data generated by said accessory processor means.

5. A system according to claim 1, wherein said accessory further includes terminal means for receiving said command transmitted by said transmitting means of the camera body.

6. A system according to claim 1, wherein said accessory includes a movable member and means for moving said movable member in response to said received command.

7. A system according to claim 1, wherein said processor means of the accessory includes means for changing said received command into a modified command executable by said accessory, said second data generated by said processor means of said accessory being indicative of said modified command.

8. A system according to claim 1, wherein said accessory is a lens unit.

9. A system according to claim 1, wherein said accessory is an electronic flash unit.

10. A system according to claim 1, wherein said accessory includes a movable member and wherein said received command is indicative of a measure of movement for said movable member.

11. A camera adapted for use in combination with an interchangeable accessory, comprising:
   (a) transmitting means for transmitting a command to said accessory;
   (b) processor means for receiving data from said accessory and for examining said data to determine whether said accessory has modified said command; and
   (c) control means for controlling the photo-taking operation of the camera body of said camera in accordance with said data.

12. A camera according to claim 11, wherein said camera body includes terminal means for transmitting said command.

13. A camera according to claim 11, wherein said transmitting means of the camera body transmits an operand along with said command.

14. A camera according to claim 13, wherein said control means of the camera body controls the photo-taking operation of said camera body in accordance with the result of comparison made between said operand transmitted by said transmitting means and said data.

15. A camera according to claim 11, wherein said command is indicative of a measure of movement for a member included in said accessory.

16. An accessory responsive to a command received from a camera to transmit data to said camera body, comprising:
(a) processor means for receiving said command transmitted by transmitting means disposed within said camera body and for modifying said command where operation of said accessory in accordance therewith is not feasible;
(b) operating means for operating said accessory in response to said command as received by said processor means; and
(c) transmitting means for transmitting data indicative of accessory operation by said operating means in response to said command.

17. An accessory according to claim 16, further comprising terminal means for receiving said command transmitted by the transmitting means of said camera body.

18. An accessory according to claim 16, wherein said processor means an operand transmitted along with said command.

19. An accessory according to claim 16, wherein said accessory includes a movable member and wherein said operating means includes means for moving said member in response to said command received by said processor means.

20. An accessory according to claim 16, wherein said processor means includes means for altering said command received by said receiving means into a command executable by said operating means.

21. An accessory according to claim 16, wherein said accessory is a lens unit.

22. An accessory according to claim 16, wherein said accessory is an electronic flash unit.

23. An accessory responsive to a command transmitted to said accessory from a camera body to transmit data to said camera body, comprising:
(a) processor means for receiving such transmitted command said operable in first mode for operating said accessory in correspondence with said received command and generating first data, and operable in second mode and therein generating second data indicative either of improper receipt of said received command or of infeasibility of operation of said accessory in accordance with said received command, and
(b) transmitting means for transmitting generated such first and second data to said camera body.

24. An accessory according to claim 23, wherein said accessory further includes terminal means for receiving said command transmitted from said camera body.

25. An accessory according to claim 23, wherein said accessory includes a movable member and means for moving said movable member in responsive to said received command.

26. An accessory according to claim 23, wherein said processor means of the accessory includes means for changing said received command into a modified command executable by said accessory, said second data generated by said processor means of said accessory being indicative of said modified command.

27. An accessory according to claim 23, wherein said accessory is a lens unit.

28. An accessory according to claim 23, wherein said accessory is an electronic flash unit.

29. An accessory according to claim 23, wherein said accessory includes a movable member and wherein said received command is indicative of a measure of movement for said movable member.

* * * * *

UNITED STATES PATENT AND TRADEMARK OFFICE
CERTIFICATE OF CORRECTION

PATENT NO. : 4,860,113

DATED : August 22, 1989

INVENTOR(S) : Ryosuke Miyamoto et al.

It is certified that error appears in the above-identified patent and that said Letters Patent is hereby corrected as shown below:

```
Item [63], change "915,014" to -- 915,019 --.
Col. 1, line 60, after "thereof" insert -- which are
         arranged to ensure adequate and reliable --.
Col. 3, line 40, change "sum-micom" to -- sub-micom --.
Col. 9, line 22, change "necessitate" to -- necessitates --.
Col. 9, line 37, change "F H" to --  F ⌐⌐ H --, and after
         "wherein" insert --  ⌐⌐  --.
Col. 9, line 63, delete "to".
Col. 11, line 4, change "sprit" to -- spirit --.
Col. 13, line 25, after "processor means" insert -- receives --.
Col. 14, line 7, change "said" to -- and --.
```

Signed and Sealed this

Thirty-first Day of July, 1990

Attest:

HARRY F. MANBECK, JR.

*Attesting Officer*    *Commissioner of Patents and Trademarks*